United States Patent
Sumihara et al.

(12)

(10) Patent No.: US 6,841,187 B2
(45) Date of Patent: Jan. 11, 2005

(54) **DRINKS CONSISTING OF EXTRACTS OF *FOMES JAPONICUS* EXTRACTED WITH HONEY AND VINEGAR**

(75) Inventors: Kazuhiko Sumihara, Hiroshima (JP); Takeshi Ishikawa, Hiroshima (JP)

(73) Assignee: Mishima Foods Co., Ltd., Hiroshima (JP)

( * ) Notice: Subject to any disclaimer, the term of this patent is extended or adjusted under 35 U.S.C. 154(b) by 209 days.

(21) Appl. No.: 10/235,829

(22) Filed: Sep. 6, 2002

(65) Prior Publication Data

US 2003/0096049 A1 May 22, 2003

Related U.S. Application Data

(60) Provisional application No. 60/327,031, filed on Oct. 5, 2001.

(30) Foreign Application Priority Data

Sep. 17, 2001  (JP) ........................................ 2001-281672

(51) Int. Cl.⁷ .................................................. A23L 1/28
(52) U.S. Cl. ........................ 426/655; 426/590; 426/425; 426/430
(58) Field of Search .............................. 426/590, 330.5, 426/425, 435, 506, 650, 655, 430

(56) References Cited

U.S. PATENT DOCUMENTS

| | | | | |
|---|---|---|---|---|
| 5,690,984 A | * | 11/1997 | Lim | ........................... 426/590 |
| 6,416,795 B1 | * | 7/2002 | Choi et al. | .................. 424/725 |
| 2002/0164352 A1 | * | 11/2002 | Donatini | ................ 424/195.15 |

FOREIGN PATENT DOCUMENTS

| | | |
|---|---|---|
| DE | 32 37 245 | 4/1984 |
| JP | 2000-166507 | 6/2000 |

* cited by examiner

*Primary Examiner*—N. Bhat
(74) *Attorney, Agent, or Firm*—Oblon, Spivak, McClelland, Maier & Neustadt, P.C.

(57) ABSTRACT

A *Fomes japonicus* extract is prepared by extracting *Fomes japonicus* with a mixture of honey and vinegar, heating the resulting extract to a temperature of not less than 95° C. and then filtering the heated extract. The *Fomes japonicus* extract can be diluted with water to give a drink such as a health beverage. Moreover, the addition of royal jelly to the extract permits the preparation of a royal jelly-supplemented drink additionally having nutritive and restorative effects.

30 Claims, No Drawings

DRINKS CONSISTING OF EXTRACTS OF *FOMES JAPONICUS* EXTRACTED WITH HONEY AND VINEGAR

CROSS-REFERENCE TO RELATED APPLICATIONS

The present application is a continuation of provisional application Ser. No. 60/327,031 filed Oct. 5, 2001.

SUMMARY OF THE INVENTION

1. Field of the Invention

The present invention relates to a method for preparing a *Fomes japonicus* extract, which emits only a reduced odor of acetic acid and which is free of any turbidity, as well as to a method for preparing a drink obtained from the *Fomes japonicus* extract.

2. Description of the Background

*Fomes japonicus* (REISHI) is a kind of mushroom also called the bracket fungus of the genus *Fomes* belonging to the family Polyporaceae. The plant has been used in the past for a variety of therapeutic properties attributed to consumption of the plant including improvement of the blood circulation; the prevention of, for instance, headaches, anemia, oversensitivity to the cold and allergic diseases; relief of fatigue; as well as a carcinostatic effect. *Fomes japonicus* has been highly prized as a Chinese herbal remedy.

*Fomes japonicus* extract has conventionally been used in, for instance, health foods and Chinese herbal remedies. Methods for preparing such a *Fomes japonicus* extract include a method based on the extraction of *Fomes japonicus* with hot water and a method which comprises a combination of hot water extraction and alcohol extraction. When extracting the *Fomes japonicus* with water, however, the *Fomes japonicus* extract which results has poor shelf stability at room temperature. For this reason, the present inventors had earlier found that a *Fomes japonicus* extract having excellent long-term shelf stability and an excellent nutritional balance can be prepared if the *Fomes japonicus* is extracted with honey and vinegar without using water and/or an alcohol. A patent application was filed which describes this discovery as Japanese Patent Application Serial No. Hei 10-349960, which was granted as Japanese Patent No. 2,983,981.

The invention disclosed in the Japanese patent application describes the preparation of a *Fomes japonicus* extract having excellent long-term shelf stability and excellent nutritional balance. The document also describes the preparation of a drink which is prepared from the *Fomes japonicus* extract. On the one hand, however, the invention described requires the use of vinegar to extract *Fomes japonicus* with the result that the *Fomes japonicus* extract obtained emits an odor peculiar to the vinegar component of the extract. Accordingly, when the extract is used in the form of a drink, a problem which arises is that for some consumers of the product, its odor is repugnant. On the other hand, the extract also suffers has the problem that suspended matter or precipitates sometimes form in the *Fomes japonicus* extract and this makes the drinking of the same difficult from the psychological standpoint.

SUMMARY OF THE INVENTION

Accordingly, one object of the present invention to provide a *Fomes japonicus* extract that is easy to drink and that has excellent long-term shelf stability, as well as to provide a drink containing the extract.

Briefly, this object and other objects of the present invention as hereinafter will become more readily apparent can be attained by a method for preparing *Fomes japonicus* extract, comprising:

extracting *Fomes japonicus* with honey and vinegar to prepare a *Fomes japonicus* extract:

heating the *Fomes japonicus* extract at a temperature of not less than 95° C.; and filtering the *Fomes japonicus* extract.

Another aspect of the invention is a method for preparing a drink comprising a *Fomes japonicus* extract with honey and vinegar, comprising:

extracting *Fomes japonicus* with honey and vinegar to prepare a *Fomes japonicus* extract;

heating the *Fomes japonicus* extract at a temperature of not less than 95°;

filtering the *Fomes japonicus* extract; and diluting the resulting *Fomes japonicus* extract with water.

DETAILED DESCRIPTION OF THE PREFERRED EMBODIMENTS

The present invention has resulted from a study by the inventors to solve the foregoing problems, and have found that a *Fomes japonicus* extract can be prepared whose odor, which results from the presence of vinegar (acetic acid) therein, can be substantially reduced. The extract possesses excellent long-term shelf stability and nutritional balance. Moreover, a drink comprising the *Fomes japonicus* extract can be prepared by subjecting the extract to a heat treatment at a temperature of not less than 95° C.

*Fomes japonicus* used as a starting material in the present invention is scientifically named "*Ganoderma lucidum*" and is called the bracket fungus of the genus *Fomes* in Japanese. *Fomes japonicus* is a kind of mushroom which belongs to the family Polyporaceae (It is said that this family includes not less than about 200 kinds of mushrooms) and is an annual mushroom.

It has been confirmed that *Fomes japonicus* includes not less than about 200 kinds of components which include, for instance, polysaccharides (β-glucans and ganoderans A, B and C), ganoderic acids, ganoderenic acids, lucidons, ganoders and ergosterols.

The honey that is utilized in the present invention is not restricted to any particular type and includes those obtained from a variety of flowers (such as acacia).

The vinegar employed as a starting material in the invention is, for instance, edible vinegar. The concentration of vinegar used in the extraction step is suitably 4 to 10% and preferably 4 to 5%, as expressed in terms of the acid value.

Although the inventors do not want to be bound by any particular theory, the extraction of *Fomes japonicus* with a material comprising a combination of honey and vinegar would permit the effective extraction of the components of *Fomes japonicus*. The improvement of the nutritional balance of the resulting extract can be attributed to the addition of nutrients to the product because of the use of the honey. Improvement of the extraction efficiency results from the use of the vinegar among others materials and improvement of the long-term shelf stability of the resulting extract is attributable to the simultaneous use of these extracting substances.

More specifically, the *Fomes japonicus* extract of the present invention is prepared as follows, using honey and vinegar in combination.

First, *Fomes japonicus* is washed with vinegar to remove any contaminants which adhered to the mushroom bodies. In this respect, washing of the bodies with water is not preferred, because the shelf stability of the resulting *Fomes japonicus* extract is reduced because of the contamination of the bodies with water. This washing step is suitably conducted at a temperature ranging from 0 to 25° C., preferably 15 to 25° C. and it is in general conducted at room temperature.

After washing with vinegar, the *Fomes japonicus* is removed from the vinegar. This step is called "a setting off step".

Then, the *Fomes japonicus* thus washed is crushed. The size (average particle size) of the *Fomes japonicus* particles obtained after the crushing is suitably, for instance, not more than 20 mm, preferably 5 to 10 mm.

The crushed *Fomes japonicus* is admixed with weighed honey and vinegar and stored while the *Fomes japonicus* particles are immersed in the mixed honey and vinegar (soaking or immersion step). This soaking step is suitably continued over a term commonly ranging from about 20 days to 3 months and preferably about 30 days to 2 months. Good efficiency of the extraction of, for instance, ganoderic acids which are components of the *Fomes japonicus* can be achieved if the *Fomes japonicus* is stored over the term specified above (Japanese Patent No.2,983,981). The temperature during the soaking step is preferably high in order to promote the soaking step, but *Fomes japonicus* is liable to undergo putrefaction if using a high temperature in this step. Accordingly, it is generally suitable to conduct the soaking step at a temperature ranging from 0 to 40° C., preferably 20 to 30° C. and commonly at room temperature.

In general, the mixing ratio (by weight) of the honey to the vinegar suitably ranges from 30~70: 70~30, preferably 40~60: 60~40. In this connection, there is a tendency that the higher the quantity of the vinegar, the shorter the time required for the soaking step.

In addition, the amount of the *Fomes japonicus* particles relative to the total amount of the honey and the vinegar suitably ranges from 0.1 to 20 parts by weight, preferably 0.5 to 10 parts by weight per 100 parts by weight of the total amount of the honey and the vinegar.

After the completion of the soaking step, the *Fomes japonicus* particles are separated from the extract ("the setting off step").

The resulting *Fomes japonicus* extract contains residues and therefore, it is preferred to filter the extract through a filter whose openings range from 30 to 50 mesh (the sides of each opening ranging in length from 650 to 360 $\mu$m) and preferably 40 to 45 mesh (an opening ranging from 440 to 400 $\mu$m).

Moreover, it is preferred that the filtered *Fomes japonicus* extract be allowed to stand, for instance, for 5 to 20 days, preferably 6 to 10 days to allow components susceptible to precipitation to precipitate, and then filter the extract through a filter having an opening, for instance, ranging from 5 to 20 $\mu$m and preferably 7 to 15 $\mu$m.

Subsequently, the resulting *Fomes japonicus* extract is placed in a suitable container such as a can, a bottle or a plastic container and then stored. Under these conditions, no deterioration of the quality of the *Fomes japonicus* extract is observed, even after storage over 3 years.

The *Fomes japonicus* extract thus prepared should be heat-treated at a temperature of not less than 95° C., preferably 97 to 98° C. Such a heat treatment normally achieves the substantial elimination of the peculiar vinegar odor from the *Fomes japonicus* extract. It has also been found that this heat treatment accelerates the separation of precipitates or lye present in the *Fomes japonicus* extract. Thus, the heat treatment provides an additional advantage of facilitating the separation of precipitates or lye in a subsequent filtration step normally employed to separate these materials.

Incidentally, the saccharinity of the *Fomes japonicus* extract is suitably controlled to a level of, for instance, 40 to 60%, preferably 45 to 55%, after the heat treatment in order to stabilize the quality (saccharinity) of the final product and to prevent any excess heating during the heating step. If the saccharinity is less than 40%, the elimination of the odor of acetic acid is insufficient, while if the saccharinity exceeds 60%, the excess heating adversely affects the color and/or flavor of the product. The saccharinity can be controlled by, for instance, the addition of a sweetener or the like to the extract.

After the heat treatment or achieving control of the saccharinity of the extract, the *Fomes japonicus* extract is preferably filtered using a filter having a opening sizes ranging from 110 to 350 mesh (an opening ranging from 161 to 38 $\mu$m), preferably 300 to 350 mesh (an opening ranging from 50 to 42 $\mu$m). This filtration step achieves the removal of the residues derived from the *Fomes japonicus* and results in a clear *Fomes japonicus* extract. An example of such a filter usable herein is a stainless steel filter. Moreover, it is suitable to use gauze in combination with a filter for the removal of large foreign substances, which interfere with high filtration efficiency.

Thereafter, the *Fomes japonicus* extract is diluted with water to prepare a liquid for preparing a drink. The water used herein may be tap water, well water (underground water) or deionized water.

When diluting the *Fomes japonicus* extract with water, preferably water is added to the extract in an amount ranging from 900 to 1300 parts by weight, preferably 1000 to 1200 parts by weight per 100 parts by weight of the *Fomes japonicus* extract. A sweetener is added to prepare a liquid for preparing the drink in order to improve the drinkability of the resulting drink as a final product.

The sweetener employed is not limited to particular sweeteners and any conventional sweetener may be used. Suitable examples of such sweeteners include disaccharides such as cane sugar (sucrose), malt sugar (maltose) and milk sugar (lactose); trisaccharides such as maltotriose; and synthetic sweeteners such as aspartame.

The sweetener may be used in any amount, but preferred suitable amounts range from, for instance, 200 to 280 parts by weight, particularly preferably 220 to 260 parts by weight per 100 parts by weight of the *Fomes japonicus* extract.

The liquid from which a drink is prepared contains water. Accordingly, in the process of preparing the drink, the liquid should be sterilized, for instance, by heating the liquid or by irradiating the liquid with ultraviolet light rays prior to the packaging of the liquid in a container to improve the shelf stability of the drink. Sterilization by heating is conducted, for instance, at a temperature of less than 90° C., preferably at a temperature ranging from about 80 to 85° C. This heat treatment is completely different from the treatment which reduces the peculiar odor attributable to the vinegar in the liquid. The heat treatment for the reduction of such an odor as described above is conducted at a temperature of not less than 95° C., which is higher than that used for the sterilization of, for instance, *Escherichia coli* by heating. In addition, the heat treatment for sterilization is conducted immediately before the preparation of the final product, while that for the elimination of odors is conducted prior to the final treatment and more specifically prior to the filtration treatment.

The liquid used for the preparation of a drink thus obtained is preferably stored or allowed to stand at a low temperature for a short period of time. This treatment of the liquid or allowing the liquid to stand permits fine particles still remaining in the liquid to settle from the liquid used for the preparation of drinks. By this procedure a drink can be prepared which is a final product of excellent clearness.

The low temperature employed in the settlement process is suitably on the order of that at which the liquid used for the preparation of a drink is not frozen, for instance, not more than 10° C., preferably −5 to 5° C. and more preferably −2 to 3° C.

The time over which the liquid is allowed to stand suitably ranges, for instance, from about 5 days to 10 days, preferably about 6 days to 8 days.

After the liquid used for the preparation of a drink is allowed to stand, it is suitably filtered through a filter having openings ranging from 1 to 20 μm, preferably openings ranging from 1 to 5 μm. A preferred filter is, for instance, one formed from polypropylene fibers. Moreover, it is preferred that the liquid be filtered more than three times using, for instance, three types of filters having openings of 3 μm, 3 μm and 1 μm, respectively. The size of the spores of the *Fomes japonicus* is not more than 1 μm and therefore, the opening of the filter used suitably ranges from about 1 to 10 μm.

Such a filtration treatment permits the preparation of a liquid which is useful for the preparation of a drink having considerably high transparency or clearness, and which is pleasant to look at and hence easy to drink.

In an embodiment of the invention, royal jelly is preferably incorporated into the liquid used for preparing a drink of the present invention. The added value of the resulting drink can be improved by the addition of such royal jelly.

However, the royal jelly in itself has an extremely high viscosity (11000 cP as determined at 25° C.). For this reason, it has been found that the simple addition of the jelly to the liquid for preparing a drink does not permit the formation of a uniform mixture of the royal jelly in the liquid. However, the present inventors have found that the royal jelly can be uniformly dispersed in the liquid within a short period of time by first mixing honey, water and royal jelly, emulsifying the mixture by mixing these ingredients with stirring at a temperature of not more than 30° C., for instance about 10 to 25° C. to thus prepare an emulsion of royal jelly and then mixing the resulting emulsion with the liquid for preparing a drink.

In the royal jelly emulsion, it is suitable to use the royal jelly in an amount ranging, for instance, from 10 to 50 parts by weight, preferably 20 to 40 parts by weight per 100 parts by weight of the honey. On the other hand, water is suitably used, in the emulsion, in an amount ranging from 30 to 100 parts by weight, preferably from 40 to 50 parts by weight per 100 parts by weight of the honey.

The viscosity of the emulsion containing royal jelly as determined at a temperature of 25° C. suitably ranges, for instance, from 150 to 100 cP, preferably from 150 to 400 cP.

It is sufficient to stir the royal jelly mixture for a time ranging, for instance, from 1 to 15 minutes, preferably from 2 to 8 minutes.

In this connection, the royal jelly emulsion is suitably heated to a temperature of not more than 85° C., for instance, 60 to 80° C. to remove any air bubbles present in the emulsion.

The royal jelly emulsion is suitably incorporated into the liquid for preparing a drink in an amount, for instance, ranging from 1 to 10 parts by weight, preferably from 5 to 7 parts by weight per 100 parts by weight of the liquid. The mixing operation is suitably conducted at a temperature ranging, for instance, from room temperature to 35° C.

The royal jelly-containing liquid for preparing a drink thus prepared is then introduced into a desired container to provide a raw liquid for preparing a drink. In this case, the royal jelly-containing liquid for preparing a drink is heated to a temperature ranging from 65 to 85° C., preferably 80 to 85° C. in order to sterilize the same.

Having generally described this invention, a further understanding can be obtained by reference to certain specific examples which are provided herein for purposes of illustration only and are not intended to be limiting unless otherwise specified.

EXAMPLE 1

After washing *Fomes japonicus* with edible vinegar (acid value 4.5%), the *Fomes japonicus* was crushed into particles having an average particle size ranging from 5 to 10 mm and then the *Fomes japonicus* particles were admixed with a mixed liquid containing honey and edible vinegar (57:43) in an amount of 0.3 part by weight per 100 parts by weight of the mixed liquid, thereby immersing the former in the latter over 2 months. After the completion of the immersion, the *Fomes japonicus* particles were removed from the treating liquid to give a *Fomes japonicus* extract.

The resulting *Fomes japonicus* extract was filtered through a stainless steel filter having a pore size of 40 mesh (openings of 440 μm), thereby removing the residues.

Moreover, the *Fomes japonicus* extract was allowed to stand over one week over which time a precipitate was formed, followed by the recovery of the supernatant to give a *Fomes japonicus* extract which is useful for the preparation of a drink.

Evaluation of Heat—Treatment of *Fomes japonicus* Extract

The foregoing *Fomes japonicus* extract was heated to 95° C. or 100° C. for 10 minutes to give *Fomes japonicus* extracts 4 and 5 as shown in the following Table 1. Separately, the same procedures used above in connection with the preparation of the *Fomes japonicus* extracts 4 and 5 were repeated except that the heating temperature was changed or it was omitted. *Fomes japonicus* extracts 1 to 3 were thus formed for purposes of comparison.

The intensity of the odor of each preparation was evaluated according to a sensory test using 10 panelists, and the number of panelists who felt the weakest odor was recorded for each extract. Therefore, the results means that the greater the number of panelists, the weaker the odor of the extract.

TABLE 1

| Fomes japonicus Extract No. | 1 (Ref.) | 2 (Ref.) | 3 (Ref.) | 4 (Ref.) | 5 (Ref.) |
|---|---|---|---|---|---|
| Heating Temp. (° C.) | Not heated | 85 | 90 | 95 | 100 |
| Number of Panelists | 1 | 1 | 2 | 6 | 8 |

The results listed in Table 1 clearly indicate that the odor of the extract peculiar to acetic acid is substantially reduced by heating the same at a temperature of not less than 95° C.

EXAMPLE 2

It was found that the *Fomes japonicus* extract of the invention prepared as described in Example 1 freshly generates precipitates by the heating process. A heated extract was filtered using a combination of gauze and a stainless steel filter having a pore size of 330 mesh (an opening of 46 μm) in such a manner that the gauze was arranged on the filter.

Then, a drink was prepared, which comprised the following components.

| Components Incorporated | Rate (%) of Incorporation |
|---|---|
| Fomes japonicus Extract | 7 |
| Water (underground water) | 80 |
| Galacto-oligosaceharide | 13 |
| Sum | 100 |

The resulting drink was sterilized by heating the same to 85° C. The resulting drink did not emit an odor peculiar to acetic acid, was excellent in transparency and was found to be quite easy to drink.

Incidentally, the drink was additionally subjected to a filtration treatment according to the following method to further improve its quality.

First of all, the drink was allowed to stand over 7 days in a refrigerator whose temperature had been set at 3° C. to thus precipitate the suspended matter generated in the drink. Then, the supernatant was recovered, filtered twice through a cartridge filter formed from polypropylene fibers and having openings of 3 μm and once through a cartridge filter formed from polypropylene fibers and having openings of 1 μm. Finally, the drink was further filtered through a cartridge membrane having a pore size of 1 μm and formed from polypropylene filaments. The resulting drink was found to be quite clear because of the foregoing series of filtration operations.

EXAMPLE 3

Royal Jelly-Containing Drink

To the quite clear drink prepared in Example 2, there was added a royal jelly emulsion prepared according to the following method to thus give a royal jelly-supplemented Fomes japonicus extract-containing drink.

Preparation of Royal Jelly Emulsion

To 100 parts by weight of honey, there were added 20 parts by weight of royal jelly and 40 parts by weight of water, followed by stirring the resulting mixture in a mixer made of glass at 20° C. for 3 minutes and at a rotation of 3000 rpm to thus emulsify the royal jelly. By this procedure, the royal jelly had a viscosity of 11000 cP. However, the viscosity of the royal jelly emulsion prepared through the foregoing emulsification was considerably low on the order of 160 cP. Then, the royal jelly emulsion was heated to 85° C. to eliminate any air bubbles present in the emulsion.

The resulting royal jelly emulsion was admixed with the quite clear drink prepared in Example 2 in an amount of 6 parts by weight per 100 parts by weight of the latter. Then, the resulting liquid for preparing a drink was heated to 85° C. for sterilization and then packed in containers for distribution.

The resulting royal jelly-supplemented Fomes japonicus drink did not emit an odor peculiar to acetic acid and was quite clear and rich in nutritive value. The drink is an excellent nutritious restorative.

EFFECTS OF THE INVENTION

The present invention permits the preparation of a Fomes japonicus extract free of an odor peculiar to acetic acid and which has excellent long-term shelf stability and excellent nutritive balance. The Fomes japonicus extract can be used as a health food or a Chinese herbal remedy without any additional treatment, or can be diluted with water to give a drink such as a health beverage. Moreover, if royal jelly is incorporated into the extract, the extract can further provide a drink excellent as a nutritious restorative.

The disclosure of Japanese priority application Serial No. 2001-281672 filed Sep. 17, 2001 is hereby incorporated by reference into the present application.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A method for preparing Fomes japonicus extract, comprising:
    (1) extracting Fomes japonicus with honey and vinegar at a temperature ranging from 0 to 40° C. to prepare a Fomes japonicus extract;
    (2) heating the Fomes japonicus extract at a temperature of not less than 95° C.; and
    (3) filtering the Fomes japonicus extract.

2. The method of claim 1, wherein the concentration of vinegar in the extraction step ranges from 4 to 10%.

3. The method of claim 1, wherein the mixing ratio of honey to vinegar for the extraction step ranges from 30-70:70-30.

4. The method of claim 1, wherein, in the extraction step, the amount of particles of Fomes japonicus ranges from 0.1 to 20 parts by weight per 100 parts by weight of the total amount of honey and vinegar.

5. The method of claim 1, which further comprises
    filtering the extract prepared which contains particles and then
    allowing the extract to stand thereby permitting additional material to precipitate from the extract followed by filtration of the extract.

6. The method of claim 5, which further comprises heat treating the filtered extract at a temperature not less than 95° C.

7. The method of claim 6, wherein the extract is heat treated at a temperature of 97 to 98° C.

8. The method of claim 6, wherein the extract is adjusted to a saccharinity of 40 to 60%.

9. A method for preparing a drink, comprising:
    (1) extracting Fomes japonicus with honey and vinegar at a temperature ranging from 0 to 40° C. to prepare a Fomes japonicus extract;
    (2) heating the Fomes japonicus extract at a temperature of not less than 95° C.;
    (3) filtering the Fomes japonicus extract; and
    (4) diluting the resulting Fomes japonicus extract with water, thereby preparing a drink consisting of an extract of Fomes japonicus extracted with honey and vinegar.

10. The method of claim 9, wherein the concentration of vinegar in the extraction step ranges from 4 to 10%.

11. The method of claim 9, wherein the mixing ratio of honey to vinegar for the extraction step ranges from 30-70:70-30.

12. The method of claim 9, wherein, in the extraction step, the amount of particles of Fomes japonicus ranges from 0.1 to 20 parts by weight per 100 parts by weight of the total amount of honey and vinegar.

13. The method of claim 9, which further comprises filtering the extract prepared which contains particles and then allowing the extract to stand thereby permitting additional material to precipitate from the extract followed by filtration of the extract.

14. The method of claim 13, which further comprises heat treating the filtered extract at a temperature not less than 95° C.

15. The method of claim 14, wherein the extract is heat treated at a temperature of 97 to 98° C.

16. The method of claim 14, wherein the extract is adjusted to a saccharinity of 40 to 60%.

17. The method of claim 9, further comprising allowing the drink to stand at a low temperature and then filtering the drink, subsequent to the step (4).

18. The method of claim 9, further comprising incorporating royal jelly into the drink.

19. A method for preparing *Fomes japonicus* extract comprising:

extracting *Fomes japonicus* with honey and vinegar at a temperature ranging from 0 to 40° C. to prepare a *Fomes japonicus* extract.

20. The method of claim 19, wherein the *Fomes japonicus* is washed with vinegar prior to extraction.

21. The method of claim 19, wherein the *Fomes japonicus* is crushed to a particle size of not more than 20 mm prior to extraction.

22. The method of claim 21, wherein said *Fomes japonicus* is extracted with honey and vinegar for a period of about 20 days to 3 months.

23. The method of claim 22, further comprising:

separating the *Fomes japonicus* particles from the extract.

24. The method of claim 23, further comprising filtering the extract to remove *Fomes japonicus* particles using a filter having openings ranging from 30 to 50 mesh thereby obtaining a liquid *Fomes japonicus* extract.

25. The method of claim 23, further comprising allowing the filtered liquid *Fomes japonicus* extract to stand for a time suitable for precipitation of precipitable components and refiltering the extract to remove the precipitates.

26. The method of claim 25, wherein the filtered liquid extract is allowed to stand for 5 to 20 days and the precipitates are removed by filtration through a filter having openings ranging from 5 to 20 µm.

27. The method of claim 25, further comprising heat-treating the extract at a temperature of at least 95° C.

28. The method of claim 27, further comprising adjusting the saccharinity of the heated extract to range between 40 and 60%.

29. The method of claim 28, further comprising filtering the extract to remove residues and obtain a clear *Fomes japonicus* extract.

30. A *Fomes japonicus* extract prepared by the method of claim 19.

* * * * *